UNITED STATES PATENT OFFICE.

H. H. LOCKWOOD, OF MADISON, WISCONSIN.

IMPROVED MEDICAL COMPOUND.

Specification forming part of Letters Patent No. 55,123, dated May 29, 1866.

*To all whom it may concern:*

Be it known that I, H. H. LOCKWOOD, of the city of Madison, county of Dane, and State of Wisconsin, have invented a new and infallible medicine for the removal of ring-bones, spavins, splints, and curbs on horses, known as "Lockwood's Infallible Remedy;" and I do hereby declare that the following is a clear and exact statement of the component parts of and manner of compounding the same.

The component parts of my medicine are sulphuric acid, nitric acid, quicksilver, tincture of cantharides, and tincture of iodine. The proportions in which the same are to be compounded are: eight ounces sulphuric acid; eight ounces nitric acid; sixteen ounces quicksilver; eight drams tincture of cantharides; eight drams tincture of iodine. The manner of preparation is: Put the last four parts in a stone jar. Set the jar in a pail of water, so that the water will come well up about the jar. Then pour in the sulphuric acid very slow, and stir thoroughly until the whole mixture is cooked and becomes white.

This preparation will take off spavins, ring-bones, splints, and curbs. For curbs reduce one-fourth with whisky.

What I claim as my invention, and desire to secure by Letters Patent, as a new article of manufacture, is—

The medicine herein described.

H. H. LOCKWOOD.

Witnesses:
   A. PHILLIPS,
   L. PETTIT.